United States Patent [19]

Berthelot

[11] 4,047,850
[45] Sept. 13, 1977

[54] PROPORTIONING PUMP WITH PNEUMATIC DISTRIBUTOR

[75] Inventor: Guy Berthelot, Ivry, France

[73] Assignee: Commissariat a l'Energie Atomique, Paris, France

[21] Appl. No.: 362,514

[22] Filed: May 21, 1973

[30] Foreign Application Priority Data

June 2, 1972 France ................................ 72.19984

[51] Int. Cl.² .......................... F04B 9/08; F04B 35/02
[52] U.S. Cl. ..................................... 417/383; 417/403
[58] Field of Search ................ 417/403, 404, 383, 392

[56] References Cited
U.S. PATENT DOCUMENTS

| | | | |
|---|---|---|---|
| 2,192,325 | 3/1940 | Nelson | 417/403 |
| 2,413,029 | 12/1946 | McFarland | 417/383 X |
| 2,919,650 | 1/1960 | Wiggermann | 417/383 X |

Primary Examiner—William L. Freeh
Assistant Examiner—R. E. Gluck
Attorney, Agent, or Firm—William B. Kerkam, Jr.

[57] ABSTRACT

The pump comprises a measuring enclosure, a plunger mounted within the enclosure, a second enclosure which is contiguous with the first, a pneumatic jack rigidly fixed to the plunger for sliding motion within the second enclosure and defining therein a first and a second chamber, a stop rod which establishes the range of travel of the jack and a linear distributor which communicates at each end with a source of driving fluid. The distributor has three grooves such that in one end position, the measuring chamber is connected to a storage tank and one face of the jack is put into communication with one of the two sources of driving fluid and in the other end position, the measuring enclosure is connected to a collecting tank and the other face of the jack is put into communication with the other source of driving fluid.

2 Claims, 2 Drawing Figures

”

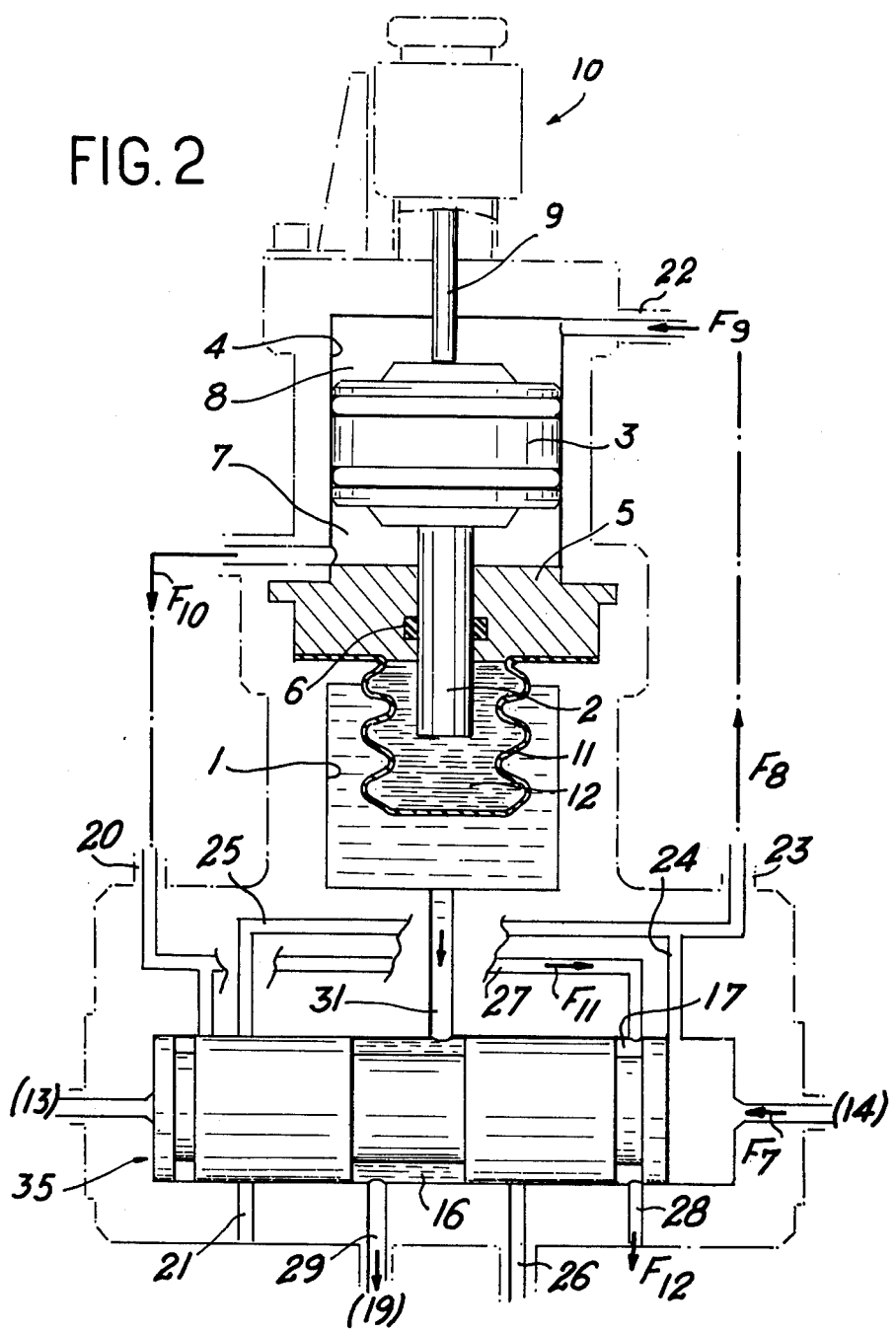

PROPORTIONING PUMP WITH PNEUMATIC DISTRIBUTOR

This invention relates to a proportioning pump with pneumatic distributor.

Said pump makes it possible in particular to collect and distribute liquids even in very small quantities and is wholly suitable for the distribution of chemcial reagents. It is thus possible by means of said pump to distribute doses ranging from 10μl to 50 ml with a high degree of accuracy.

One of the advantages offered by the pump in accordance with the invention is that it has no valves at the level of the suction and discharge; in point of fact, it is known that proportioning pumps of conventional types are usually fitted with valves which impair the accuracy with which doses of liquid are measured and supplied.

More precisely, the invention is concerned with a proportioning pump with pneumatic distributor which essentially comprises a measuring enclosure, a plunger having a constant cross-sectional area and capable of moving within said enclosure, a second enclosure which is contiguous with said measuring enclosure, a pneumatic jack rigidly fixed to said plunger and capable of sliding within said second enclosure in which said jack defines a first and a second chamber, a stop rod which serves to establish the range of sliding motion of said jack, and a linear distributor which communicates at each end with a source of driving fluid. Said distributor is provided with three grooves which, in one end position of the distributor, put said measuring enclosure into communication with a storage tank for withdrawal of liquid to be supplied in measured quantities and put that face of said jack which is directed towards said measuring enclosure into communication with one of the two sources of driving fluid and which, in the other end position of the distributor, put said measuring enclosure into communication with a collecting tank for receiving measured quantities of liquid and put the other face of said jack into communication with the other source of driving fluid. The arrangement is such that, by utilizing one of the two sources of driving fluid aforesaid, said plunger which is displaced by said jack until this latter reaches said stop rod is caused to travel over a given distance while moving away from the distributor and produces within the measuring enclosure a negative pressure for the admission of the liquid from said storage tank and that, by utilizing the other source of driving fluid, said plunger is caused to return to the initial position thereof and drives into said collecting tank a quantity of liquid equal to the quantity drawn-in, said quantity being equal to the product of the cross-sectional area of said plunger and of the range of travel thereof as defined by the position of said stop rod.

Further properties and advantages of the invention will be brought out by the following description in which one form of construction of the pump according to the invention and one mode of utilization of said pump in the case of supply of liquid in very small quantities are given by way of example but not in any sense by way of limitation, reference being made to the accompanying drawings, wherein:

FIG. 2 shows the same pump at the stage of beginning of discharge of the liquid into the collecting tank for receiving measured quantities or doses.

Figure 1:
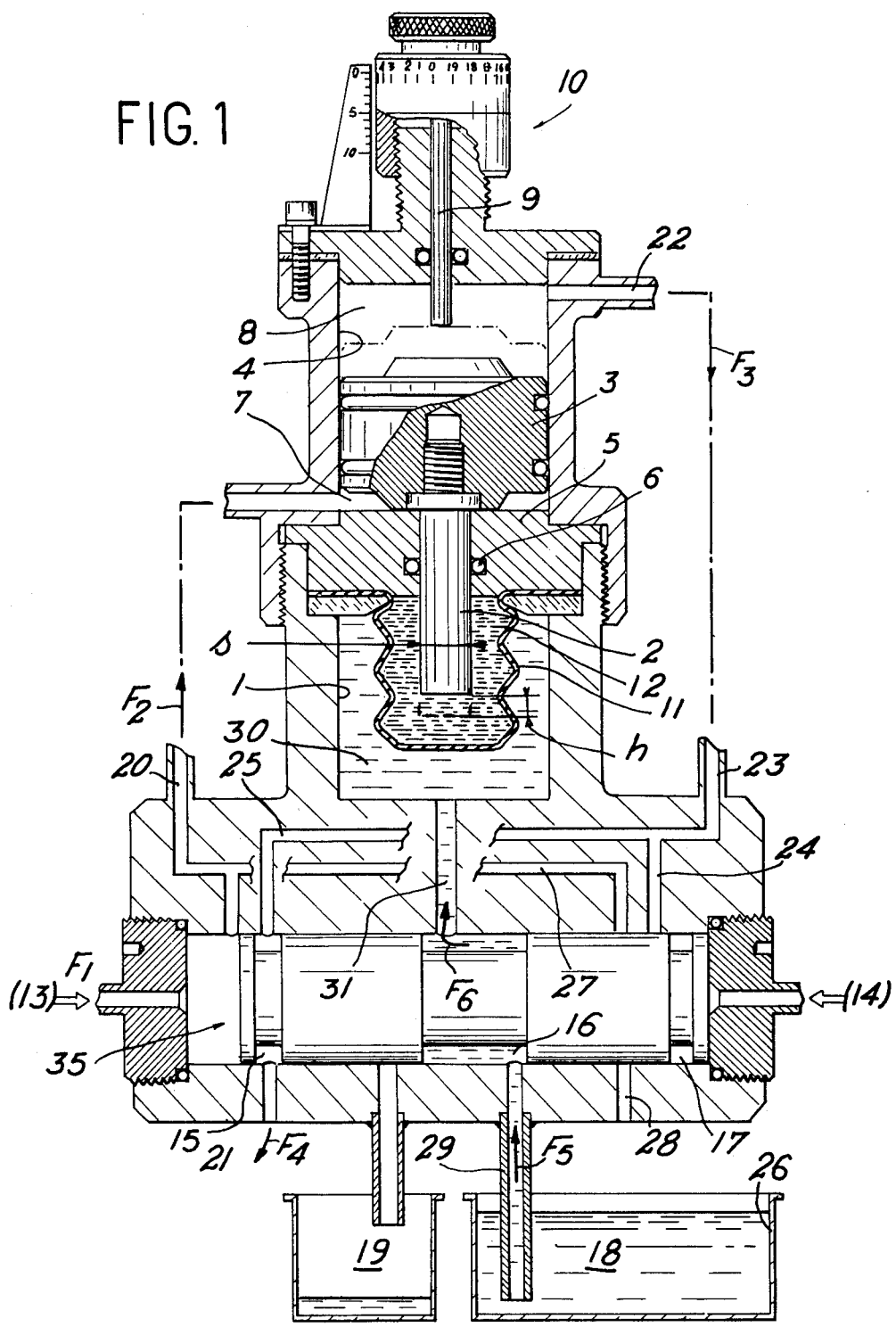
FIG. 1 is a central vertical sectional view of a proportioning pump as shown at the stage of beginning of suction of the liquid.

The pump in accordance with the invention as illustrated in these figures is considered to have the intended function of metering or supplying measured quantities of a highly corrosive liquid. Said pump is accordingly fitted with a diaphragm or bellows element which isolates the plunger of said pump from the liquid which is to be delivered in measured quantities and is contained in the measuring enclosure. It must be clearly understood, however, that the above-mentioned diaphragm is not an essential feature of the invention and that provision need not be made for such a diaphragm in a pump according to the invention as employed for the delivery of a non-corrosive liquid in measured quantities.

The pump which is shown in FIG. 1 essentially comprises:

a. a measuring enclosure 1 containing the reagent 30 to be distributed (in the case under consideration, this liquid is assumed to be highly corrosive);

b. a plunger 2 formed, for example, of methacrylic resin ("Plexiglas") and capable of displacement within said enclosure;

c. a pneumatic jack 3 which is rigidly fixed to the plunger 2;

d. a second enclosure 4 which is contiguous with the measuring enclosure 1 and separated from this latter by a partition-wall 5 (for example of stainless steel or of plastic material) through which the plunger passes in leak-tight manner by means of a seal 6.

The jack 3 divides the enclosure 4 into a first chamber 7 and a second chamber 8 and slides within said enclosure, with the result that the volume of each of the chambers 7 and 8 varies.

e. a stop rod 9 which limits the upward displacement of the jack 3. The position of said stop rod can be modified by means of a control knob 10 and corresponds in each position of said stop rod to a top end position of the jack 3 and consequently to a given metering volume;

f. a bellows element 11 which surrounds the plunger 2 and is formed of polytetrafluoroethylene ("Teflon"), for example. Said bellows element contains a non-corrosive fluid 12 such as a silicone oil, for example, which must have a low coefficient of expansion. As indicated earlier, said bellows element is not an essential feature of the invention but is indispensable in the example now under consideration by reason of the fact that the liquid 30 is highly corrosive. It is readily apparent that said bellows element must be very flexible in order to provide an instantaneous response to the displacements of the plunger 2;

g. a linear distributor 35 which communicates at the left end thereof with a source 13 of compressed air and at the right end thereof with a source 14 of compressed air.

Said distributor has three annular grooves 15, 16 and 17;

h. a storage tank 18 for the withdrawal of liquid to be metered;

i. a collecting tank 19 for receiving metered quantities of liquid or doses;

j. a series of ducts 20 to 29, the design function of which will be explained hereinafter.

The operation of the proportioning pump in accordance with the invention is as follows:

a. suction into the measuring enclosure 1 of liquid which is to be supplied in regulated quantities and is contained in the storage tank 18: compressed air from the source 13 is admitted into the distributor in the direction of the arrow $F_1$; said compressed air flows into the duct 20 in the direction of the arrow $F_2$ and lifts the jack 3 from the position shown in full lines to the position shown in chain-dotted lines, the position just mentioned being determined by the stop rod 9; the air contained in the chamber 8 is discharged through the duct 22 in the direction of the arrow $F_3$, then through the ducts 23 and 25 and, since the groove 15 is then located opposite to the ducts 25 and 21, said compressed air is permitted to escape into the atmosphere through the outlet 21 as shown by the arrow $F_4$. The groove 16 of the distributor is then located opposite to the pipe 26 which extends into the storage tank 18 and opposite to the duct 31 which terminates in the measuring enclosure 1; as a result of the upward motion of the jack 3 and consequently of the plunger 2, the liquid to be metered is accordingly drawn into the enclosure 1 as shown by the arrows $F_5$, $F_6$, the quantity of indrawn liquid being equal to the product of the cross-sectional area S of the plunger 2 and of the range of travel H of said plunger;

b. discharge of the desired dose into the collecting tank 19: compressed air is admitted from the source 14 as shown by the arrow $F_7$, then flows into the ducts 23 and 22 in the direction of the arrows $F_8$ and $F_9$ and causes the jack 3 to return downwards; since the groove 17 is then located opposite to the ducts 27 and 28, the air contained in the chamber 7 is discharged through the ducts 20 in the direction of the arrow $F_{10}$, then through the duct 27 (arrow $F_{11}$), through the duct 28 and finally into the atmosphere as shown by the arrow $F_{12}$.

The groove 16 of the distributor is then located opposite to the duct 31 and the pipe 29; a fraction of the liquid contained in the measuring enclosure 1 and equal to the predetermined dose is caused to escape into the collecting tank 19 by the downward displacement of the jack 3 and consequently of the plunger 2.

The proportioning pump in accordance with the invention as hereinabove described is normally equipped with a plunger (a few millimeters in diameter, for example) which permits the collection of doses commonly employed in the laboratory. The same pump can be equipped with a plunger (less than 1 millimeter in diameter, for example) for the purpose of collecting microdoses.

I claim:

1. A proportioning pump with pneumatic distributor, wherein said pump essentially comprises a measuring enclosure, a plunger having a constant cross-sectional area and capable of moving within said enclosure, a second enclosure which is contiguous with said measuring enclosure, a pneumatic jack having opposite faces rigidly fixed to said plunger and capable of sliding within said second enclosure in which said jack defines a first and a second chamber, a stop rod which serves to establish the range of sliding motion of said jack, and a linear distributor which communicates at each end with one of two sources of driving fluid, said distributor being provided with three grooves and being moveable from one end position to another end position which, in one end position of the distributor, said grooves put said measuring enclosure into communication with a storage tank for the withdrawal of liquid to be supplied in measured quantities and put one of said faces of said jack which is directed towards said measuring enclosure into communication with one of said sources of driving fluid and which, in the other end position of the distributor, said grooves put said measuring enclosure into communication with a collecting tank for receiving measured quantities of liquid and put the other face of said jack into communication with the other of said sources of driving fluid.

2. A pump in accordance with claim 1 wherein, in the event that the liquid to be supplied in measured quantities is highly corrosive, said plunger is surrounded by a flexible diaphragm within said measuring enclosure, the space formed between said plunger and said diaphragm being filled with a non-corrosive fluid.

* * * * *